(12) United States Patent
Turrin et al.

(10) Patent No.: US 11,087,890 B2
(45) Date of Patent: Aug. 10, 2021

(54) AUTOMATIC ONBOARDING OF DIGITAL TWINS OF PHYSICAL ASSESTS IN INTERNET-OF-THINGS (IOT) SYSTEMS

(71) Applicant: SAP SE, Walldorf (DE)

(72) Inventors: Simone Turrin, Frankenthal (DE); Mohammed Saifulla Shafiulla, Bangalore (IN); Katharina Schmitt, Weinheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/720,186

(22) Filed: Dec. 19, 2019

(65) Prior Publication Data

US 2021/0193334 A1   Jun. 24, 2021

(51) Int. Cl.
*G06F 17/30* (2006.01)
*H04L 12/24* (2006.01)
*G16Y 40/35* (2020.01)
*G05B 17/02* (2006.01)
*G16Y 20/20* (2020.01)

(52) U.S. Cl.
CPC .............. *G16Y 40/35* (2020.01); *G05B 17/02* (2013.01); *G16Y 20/20* (2020.01)

(58) Field of Classification Search
None
See application file for complete search history.

(56) References Cited

U.S. PATENT DOCUMENTS

| | | | |
|---|---|---|---|
| 2019/0094827 A1* | 3/2019 | Park | G05B 19/042 |
| 2019/0354922 A1* | 11/2019 | Berti | G06K 7/1417 |
| 2020/0059510 A1* | 2/2020 | Russom | H04L 63/0485 |
| 2020/0184014 A1* | 6/2020 | Ahaus | G06F 40/30 |
| 2020/0210268 A1* | 7/2020 | Nuthi | G06F 11/0772 |
| 2020/0211699 A1* | 7/2020 | Nuthi | G06F 11/0751 |
| 2020/0304375 A1* | 9/2020 | Chennai | H04L 41/12 |
| 2020/0372194 A1* | 11/2020 | Lopez | G06N 3/02 |

* cited by examiner

*Primary Examiner* — Natisha D Cox
(74) *Attorney, Agent, or Firm* — Fish & Richardson P.C.

(57) ABSTRACT

Methods, systems, and computer-readable storage media for receiving IoT data from an IoT device of an IoT network, the IoT data including identification data and sensor data, determining that a digital twin of the IoT device is stored in a cloud platform based on at least a portion of the identification data, the digital twin including a digital representation of the IoT device that is provided as an instance of a model of the IoT device, and enriching the digital twin with the sensor data.

17 Claims, 5 Drawing Sheets

US 11,087,890 B2

AUTOMATIC ONBOARDING OF DIGITAL TWINS OF PHYSICAL ASSESTS IN INTERNET-OF-THINGS (IOT) SYSTEMS

BACKGROUND

The Internet of Things (IoT) is a network of physical objects, or "things," embedded within electronics, software, sensors, and connectivity to enable and achieve greater value and service by exchanging data with the manufacturer, operator, and/or other connected devices or systems. The IoT provides application gateways for data aggregation and distribution that are located between application servers and numerous devices. An example application of IoT includes predictive maintenance, in which systems and sub-systems include IoT devices and/or are monitored by IoT devices, and a goal can include detecting potential failure of machines and/or components. Predicting failure is based on observations (sensor data) occurring before the failure critically affects the whole machine and causes a breakdown.

IoT can be described as an enabler of intelligent enterprises and an important asset to fuel artificial intelligence (AI). For example, an IoT network can provide data (in real-time) that is processed using, for example, AI, to make intelligent decisions in the enterprise context (e.g., enterprise operations). In some instances, IoT data is initially provided as raw time-series data, which needs to be structured and analyzed in a way that information can be extracted and used to help in decision-making processes. For example, IoT data is used to drive decisions in various domains such as fleet management, predictive maintenance, and the like. Further, IoT-generated data can be provided as the input for highly standardized and partially regulated processes (e.g., financial reporting, usage reporting, predictive maintenance). These processes lead to decisions, which can have a ripple effect influencing other areas (e.g., the stock market).

SUMMARY

Implementations of the present disclosure are directed to automatic onboarding of digital twins of physical assets in asset management platforms (AMPs). More particularly, implementations of the present disclosure are directed to automatically providing digital twins for Internet-of-Things (IoT) devices in IoT networks and enriching digital twins with sensor data provided from respective IoT devices.

In some implementations, actions include receiving IoT data from an IoT device of an IoT network, the IoT data including identification data and sensor data, determining that a digital twin of the IoT device is stored in a cloud platform based on at least a portion of the identification data, the digital twin including a digital representation of the IoT device that is provided as an instance of a model of the IoT device, and enriching the digital twin with the sensor data. Other implementations of this aspect include corresponding systems, apparatus, and computer programs, configured to perform the actions of the methods, encoded on computer storage devices.

These and other implementations can each optionally include one or more of the following features: actions further include receiving initial IoT data from the IoT device of the IoT network, the initial IoT data including the identification data, determining that the digital twin of the IoT device does not exist within the cloud platform based on at least a portion of the identification data, and creating the digital twin of the IoT device by populating the model of the IoT device with at least a portion of the identification data and with ancillary data provided from one or more data sources; the one or more data sources include one or more of an enterprise that operates the IoT network, and a manufacturer of the IoT device; the identification data includes a serial number of the IoT device, a model number of the IoT device, and a vendor identifier of a manufacturer of the IoT device; the model of the IoT device is provided by a manufacturer of the IoT device; the IoT data is provided in real-time as sensor data is generated by the IoT device; and enriching the digital twin with the sensor data includes associating the sensor data with the digital twin within the cloud platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
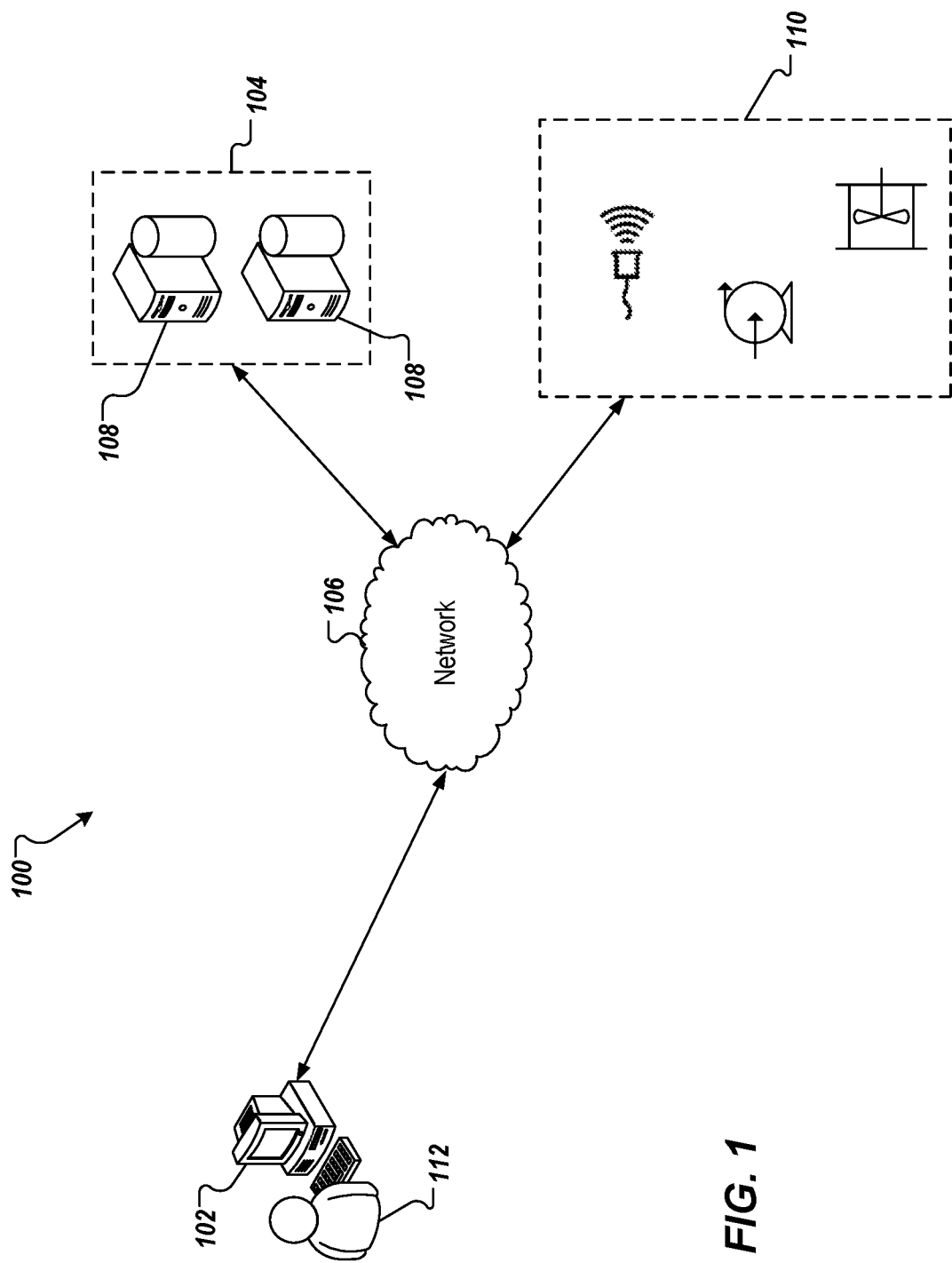
FIG. 1 depicts an example architecture that can be used to execute implementations of the present disclosure.

Implementations of the present disclosure are directed to automatic onboarding of digital twins of physical assets in asset management platforms (AMPs). More particularly, implementations of the present disclosure are directed to automatically providing digital twins for Internet-of-Things (IoT) devices in IoT networks and enriching digital twins with sensor data provided from respective IoT devices. Implementations can include actions of receiving IoT data from an IoT device of an IoT network, the IoT data including identification data and sensor data, determining that a digital twin of the IoT device is stored in a cloud platform based on at least a portion of the identification data, the digital twin including a digital representation of the IoT device that is provided as an instance of a model of the IoT device, and enriching the digital twin with the sensor data.

To provide further context for implementations of the present disclosure, and as introduced above, IoT is a network of physical objects, or "things," embedded within electronics, software, sensors, and connectivity to enable and achieve greater value and service by exchanging data with the manufacturer, operator, and/or other connected devices or systems. An IoT network provides application gateways for data aggregation and distribution that are located between application servers and numerous devices. An example application of IoT includes predictive maintenance, in which systems and sub-systems include IoT devices and/or are monitored using IoT devices, and a goal can include detecting potential failure of machines and/or components. Predicting failure is based on observations (sensor data) occurring before the failure critically affects the whole machine and causes a breakdown.

IoT can be described as an enabler of intelligent enterprises and an important asset to fuel artificial intelligence (AI). For example, an IoT network can provide data (in real-time) that is processed using, for example, AI, to make intelligent decisions in the enterprise context (e.g., enterprise operations). In some instances, IoT data is initially provided as raw time-series data, which needs to be structured and analyzed in a way that information can be extracted and used to help in decision-making processes. For example, IoT data is used to drive decisions in various domains such as fleet management, predictive maintenance, and the like. Further, IoT-generated data can be provided as the input for highly standardized and partially regulated processes (e.g., financial reporting, usage reporting, predictive maintenance). These processes lead to decisions, which can have a ripple effect influencing other areas (e.g., the stock market).

Enterprise assets, such as physical assets (IoT devices) used in IoT networks, can be monitored and managed using an asset management platform. An example asset management platform includes, without limitation, SAP Intelligent Asset Management (IAM) provided by SAP SE of Walldorf, Germany. Asset management platforms (AMPs), such as SAP IAM, can be described as a suite of computer-implemented solutions for collaborative asset intelligence, planning, prediction and simulation to equipment maintenance and operations. Example solutions in a suite can include, without limitation, maintenance management (e.g., SAP S/4HANA SAP ERP), ecosystem collaboration (e.g., SAP Asset Intelligence Network (AIN)), maintenance strategy planning (e.g., SAP Asset Strategy & Performance Management), prediction and simulation (e.g., SAP Predictive Maintenance & Service, SAP Predictive Engineering Insights), and a unified data model (UDM) as a reusable asset registry for seamless integration and data consistency. In some examples, AMPs can be implemented as an on-premise system (e.g., on a server system of an enterprise) and/or as a cloud-based system (e.g., on a third-party cloud platform on behalf of an enterprise).

In AMPs, so-called digital twins are provided for physical assets. In some examples, a digital twin can be described as a computerized companion, or virtual representation of a physical asset. An example physical asset can be a sensor (e.g., a vibration sensor) and a digital twin of the physical asset is maintained within an AMP. In some examples, a digital twin is provided as a data object that records data representative of a respective physical asset, example data being described in further detail herein. As physical assets are added to IoT networks, for example, respective digital twins are onboarded to the AMP. Onboarding includes, for example, creating a digital twin of the physical asset and populating the digital twin with information required for the AMP to consume the digital twin.

The creation of digital twins of physical assets in AMPs is a resource-intensive, error-prone process. In some examples, users manually create digital twins in an AMP by registering each digital twin, for example, among other activities. Registering of a digital twin can include creating identification parameters and entities corresponding to the physical asset and adding a series of relevant information necessary for the consumption of the digital twin according to various scenarios and objectives. Further, after the digital twin is created, the connection between a physical asset (IoT device) and its digital twin is a resource-intensive and error-prone task. In some examples, relevant portions of the information necessary for the efficient consumption of a digital twin is not available. For example, when a user is creating the digital twin of a physical asset, part of the information necessary for the future consumption of the digital twin (e.g., technical specifications, technical drawings, list of spare parts, failure modes, 3D representation of the asset) is not directly available (e.g., the information has not been shared by the manufacturer of the physical asset). On the other hand, information related to the current asset installation, operation and maintenance is usually not available when the manufacturer of the physical asset, or an external service provider, is creating the digital twin.

IoT networks continue to expand at a relatively rapid pace. Given the increasing number of IoT devices and corresponding digital twins, this results in a relatively large barrier to adoption of scenarios based on digital twins and IoT devices. In addition, some scenarios cannot be supported due to the limited information content usually associated with the digital twin.

In view of the above context, implementations of the present disclosure are directed to automatic onboarding of digital twins of physical assets in AMPS. More particularly, implementations of the present disclosure are directed to automatically combining information directly received from a physical asset (IoT device) itself with asset information provided by multiple partners involved in the management of the physical assets. Example partners can include, without limitation, manufacturers, operators, and service providers. In accordance with implementations of the present disclosure, the digital twin of a physical asset is automatically onboarded (e.g., created, registered and populated with relevant content) within an AMP.

As described in further detail herein, in response to connection of an IoT device to an IoT network, a digital twin of the IoT device is created and is registered in the AMP based on identification parameters (e.g., serial number, model type, vendor, parent asset, position) directly provided by the IoT device. Ancillary information is provided from multiple partners (e.g., manufacturer, operator, service provider) and is used to further populate the digital twin. Example ancillary information includes, without limitation, specifications, drawings, list of spare parts, failure modes, and 3D representations. In some implementations, time series data (e.g., sensor data provided by the IoT device) is automatically related to the digital twin. In some implementations, the digital twin is automatically created and synchronized in all other cloud systems and/or on-premise systems (e.g., a computerized maintenance management system (CMMS), a manufacturing execution system (YMS)) that may be required for the consumption of the digital twin according to the purposes and objectives to be supported.

FIG. 1 depicts an example architecture 100 in accordance with implementations of the present disclosure. In the depicted example, the example architecture 100 includes one or more client devices 102, a server system 104, a network 106, and IoT devices 110 (physical assets). The server system 104 includes one or more server devices and databases 108 (e.g., processors, memory). In the depicted example, a user 112 interacts with the client device 102. In an example context, the user 112 can include a user (e.g., enterprise operators, maintenance agents), who interacts with an AMP hosted by the server system 108.

In some examples, the client device 102 can communicate with the server system 104 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

In accordance with the example context, the IoT devices 110 can be part of an IoT network. In some examples, the one or more IoT devices 110 are each responsive to a component (or sub-component) and/or an environment within which the component is located, and generates data based thereon. For example, the IoT devices 110 can monitor assets, for which predictive maintenance is to be conducted. Example assets can include, without limitation, cars, trucks, trains, planes, boats, ships, buildings, factories, or components thereof (e.g., engine, motor, compressor, HVAC unit, etc.). In some examples, an asset can include one or more sub-assets (sub-components). The terms asset and sub-asset are used inter-changeably herein. In general, an asset (and sub-asset) can include any appropriate entity, for which IoT data can be provided, and data analytics can be performed. In some examples, IoT data from each IoT device 110 is provided to the server system 104 over the network 106, and the IoT data is processed to provide some output (e.g., predictive maintenance alert).

In some implementations, data values provided by sensors associated with the IoT devices 110 are transmitted to the server system 104 for processing in accordance with implementations of the present disclosure. In some examples, data values are transmitted in response to connection of an IoT device 110 to the IoT network. In some examples, each data value is associated with a respective timestamp indicating a time, at which the data value was generated. As a non-limiting example, an example format of received IoT data can be provided as:

Thing ID | Thing Type | Manufacturer ID | Location | Parent | Child where Thing ID is an identifier that uniquely identifies the IoT device (e.g., serial number), Thing Type indicates a type of the IoT device (e.g., a model number indication one of a vibration sensor, temperature sensor, speed sensor, humidity sensor), Manufacturer ID is an identifier that uniquely identifies the manufacturer of the IoT device (e.g., vendor identifier), Location indicates a location and/or IoT network where the IoT device is installed, Parent indicates a parent device that the IoT device is integrated into, if any (e.g., the IoT device is a vibration sensor that is part of a motor component (parent)), and Child indicates one or more child devices that the IoT device has integrated therein, if any (e.g., the IoT device is a motor component that includes a vibration sensor (child)). It is contemplated, however, that the format can include any appropriate information.

In some examples, information is embedded in the IoT device, which information is referred to herein as identification data. Example identification data includes a serial number (Thing ID), a model number (Thing Type), and a vendor identifier (Manufacturer ID). In some examples, the identification information is stored in computer-readable memory of the IoT device at the time of manufacture of the IoT device. Accordingly, IoT devices can be described as smart devices that know who they are.

In accordance with implementations of the present disclosure, and as noted above, the server system 104 hosts an AMP that manages physical assets of IoT networks. In some implementations, and as described in further detail herein, when a physical asset is added to an IoT network, a digital twin of the physical asset is automatically created and registered within the AMP for subsequent consumption of the digital twin.

Figure 2:
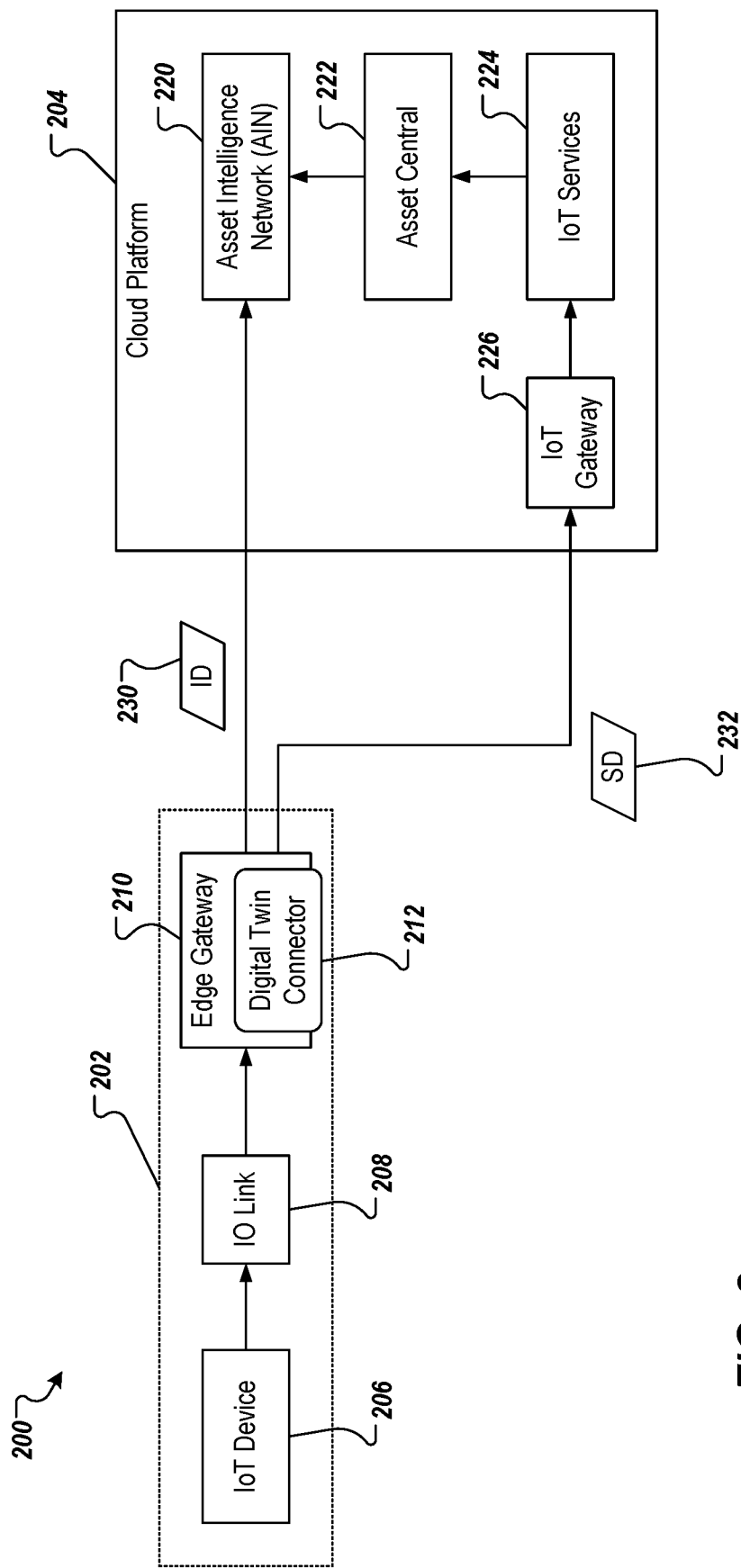
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an IoT network 202 and a cloud platform 204. The IoT network 202 includes an IoT device 206, an input/output (IO) link 208, and an edge gateway 210 that includes a digital twin connector 212. The cloud platform 204 includes an AIN 220, an asset central service 222, IoT services 224, and an IoT gateway 226. In some implementations, the IoT network 202 provides identification data (ID) 230 and sensor data (SD) 232 to the cloud platform 202.

In accordance with implementations of the present disclosure, when the IoT device 206 is added to the IoT network 202, a digital twin is automatically created and onboarded within the cloud platform 204 (e.g., within the AIN 220). Although a single IoT device 206 is depicted in the example of FIG. 2, it is contemplated that the IoT network 202 can include any appropriate number of IoT devices. The IoT device 206 can be representative of any appropriate type of IoT device, such as a component or a sub-component. For example, and without limitation, the IoT device 206 can be representative of a pump, a motor, or a machine that includes a pump and/or a motor. As another example, and without limitation, the IoT device 206 can be a sensor that is responsive to a component (or sub-component) or an environment within which the component (or sub-component) is located. Example sensors include, without limitation, a temperature sensor, a vibration sensor, a speed sensor, a humidity sensor, and a pressure sensor.

In some implementations, the IoT device 206 transmits data to the cloud platform 204 through the IO link 208 and the edge gateway 210. In some examples, the IO link 208 can be described as a short distance, bi-directional, digital, point-to-point, wired (or wireless) connector that enables communication from devices (e.g., digital sensors, actuators) to an industrial Ethernet, for example. An example IO link includes, without limitation, an IO-Link Master provided by Pepperl+Fuchs Vertrieb Deutschland GmbH of Germany. In some examples, the edge gateway 210 can be described as a hardware interface to communicate between the IoT network 202 and the cloud platform 204 in an appropriate protocol (e.g., OPC Unified Architecture (OPC UA), Message Queuing Telemetry Transport (MQTT)). An example edge gateway includes, without limitation, a netIOT edge gateway provided by Hilscher Gesellschaft für Systemautomation mbH of Germany. In accordance with implementations of the present disclosure, the edge gateway 210 includes the digital twin connector 212. In some implementations, the digital twin connector 212 makes calls to an interface of REST APIs that enable the edge gateway 210 to communicate information to the cloud platform 204 (e.g., the asset central service 222 and/or the AIN 220 within the cloud platform 204).

In some examples, the identification data 230 is data representative of the IoT device 206. Example identification data 230 includes, without limitation, serial number, model number, and vendor identifier. In some examples, the identification data 230 is provided directly from the IoT device 206 itself. For example, the identification data 230 is stored within computer-readable memory of the IoT device 206 at the time of manufacture of the IoT device 206. In the example of FIG. 2, the identification data 230 is provided to the AIN 220. In some examples, the sensor data 232 is data generated by the IoT device 206. For example, the IoT device 206 can include a sensor that is responsive to a component (or sub-component) and/or an environment within which the component (or sub-component) is located and generates data based thereon. In the example of FIG. 2, the sensor data 232 is provided to the IoT service 224 through the IoT gateway 226.

In accordance with implementations of the present disclosure, the identification data 230 is automatically sent to the cloud platform 204 when the IoT device 206 is added to the IoT network 202. Implementations of the present disclosure provide processes for smart-searching to enable automatic onboarding of digital twins, onboarding of digital twins and model matching in response to receiving the identification data 230, and automatic ingestion of sensor data to digital twins. In some examples, the asset central service 222 continuously scans the topology of the IoT network and added IoT devices are automatically onboarded through the edge gateway 210, as described herein. In some examples, the asset central service 222 maintains the digital twins of the physical assets and can be described as a reusable foundation layer across the AMP. For example, the asset central service 222 can provide a master data layer, a set of out-of-the-box integrations to back-end services and IoT solutions and provides standard functionalities that enable asset modeling and management.

With regard to smart-searching, pre-requisites for automatically registering IoT devices are created. More particularly, for registration of an IoT device (e.g., with model information provided in the identification data), models should already be available in the cloud platform (e.g., in an account of the enterprise, for which asset management and/or IoT services are provided). Accordingly, implementations of the present disclosure provide an example process for providing models as a pre-requisite, to be used during IoT device registration and associated with the IoT device. In some examples, a digital twin can be described as an instance of a model.

In some implementations, a model is based on a model template. In some examples, model templates are provided by a provider of the edge gateway, through which data is provided from the IoT network (e.g., the edge gateway 210). If a model template is available, the model template is populated with at least a portion of the identification data provided from the IoT device to provide a digital twin of the IoT device as an instance of a model. If a model template is not available, a search can be conducted to create a model, and/or manual intervention can be requested.

In some examples, a model template (or a subclass) is a structural element used for classification of an asset or a digital twin. In some examples, the model template represents the family to which an asset belongs. This enables better classification of assets and improving the data quality by using industry standard templates, which enrich the asset with generic and standard set of characteristics and related information. Using model templates (classification templates), a model can be created to provide an abstract representation of the asset. A model is a blueprint of the asset, primarily representing its make and generic features. An instance of a model is an equipment, which represents the digital twin (which has a real world physical existence).

Figure 3:
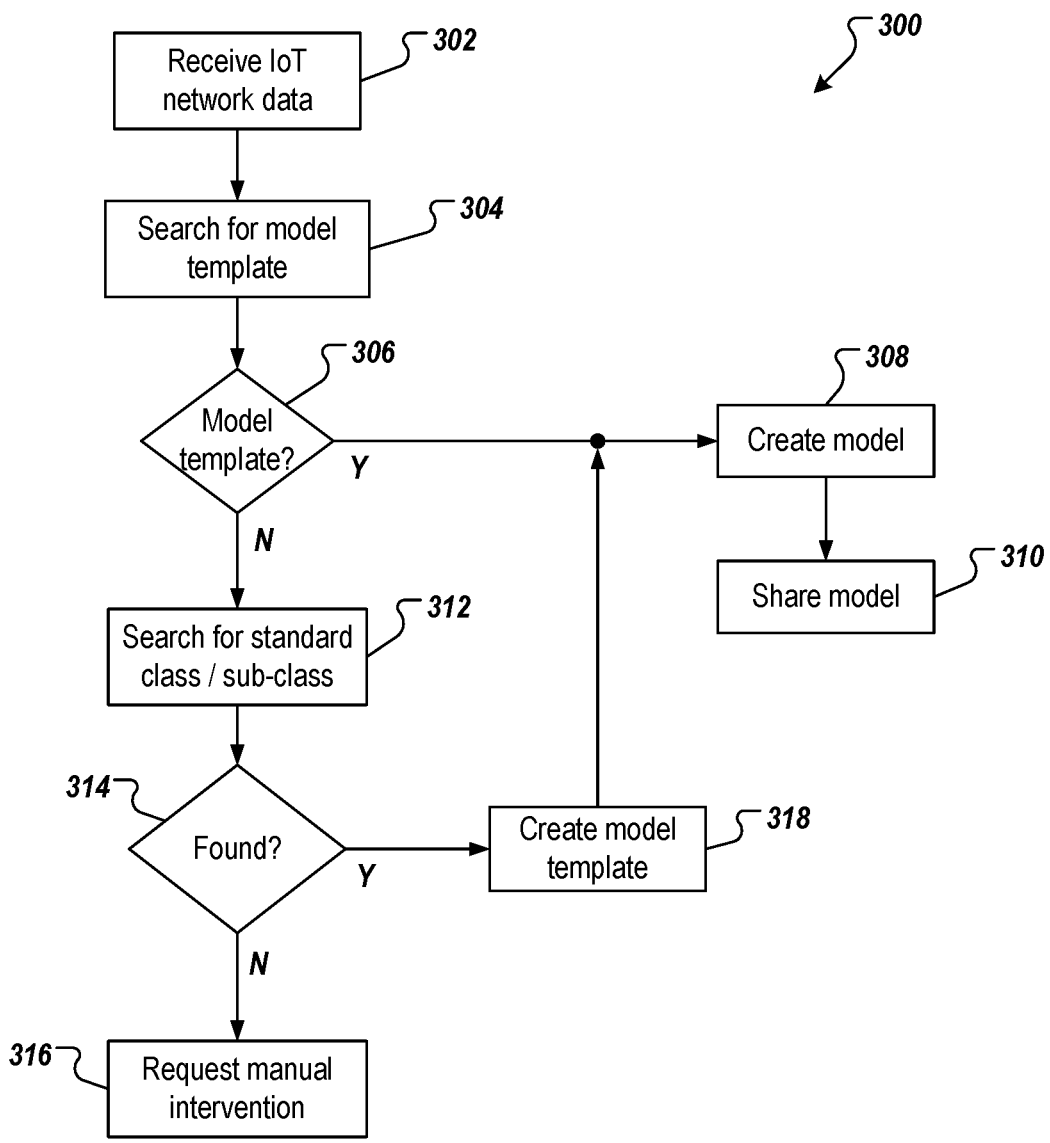
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. The example process 300 is executed to provide models for subsequent IoT device registration and digital twin onboarding.

IoT network data is received (302). For example, an edge gateway (e.g., the edge gateway 210 of the IoT network 202 of FIG. 2) provides IoT network data that can be received by a cloud platform (e.g., the cloud platform 202). In some examples, the IoT network data includes data representative of one or more IoT devices that can be included in the IoT network. A search for a model template is performed (304). In some examples, a search for a model template is performed for each type of IoT device that can be included in the IoT network. For example, for a particular IoT device, it can be determined whether a model template exists (e.g., in an account of the gateway provider that is maintained within the cloud platform). In some examples, the search is an attribute-based search and/or a fuzzy search (e.g., approximate matches).

It is determined whether a model template is available (306). For example, it can be determined whether a model template corresponding to search parameters (e.g., one or more attributes) is included in the account of the gateway provider within the cloud platform). If a model template is available, a model is created (308) and, optionally, the model is shared (310). In some examples, the model is created by at least partially populating the model template with information that is relevant to the IoT device. In some examples, sharing of the model includes providing the model and/or a link to the model to one or more stakeholders (e.g., to an enterprise that operates the IoT network).

If a model template is not available, a search is performed for a standard class/subclass (312). In some examples, the search is based on fuzzy search and a close match to the asset family or taxonomy is found. Although multiple results are found, the closest match with the highest accuracy score is considered. The search is conducted on the database having all the industry standard classification templates within asset central foundation. If a standard class/sub-class is not found, manual intervention is requested or can be automated for process continuity (316). For example, a request can be submitted to an operations team that manages the AIN, which operations team can perform some action in response. In an automated scenario, if a class/subclass is not available, the system creates a model template based on the information it has about the asset and its family and continues with the process of creating a model. For example, the operations team can define a standard class/sub-class for the IoT device, and/or can provide a model template. If a standard class/sub-class is found, a model template is created (318), and the example process 300 loops back to create a model (308). A model template is created either manually or automated using supported application interfaces (REST APIs) either by inheriting from a matching class/subclass or even independently based on the family of the asset.

As introduced above, implementations of the present disclosure also provide for automatic registration of IoT devices that are added to an IoT network. In some implementations, this occurs after the edge gateway is connected to the production line (e.g., the environment within which IoT devices are to be installed and operate). In some implementations, in response to receiving identification data from an IoT device (e.g., a newly added IoT device), the edge gateway initiates registration of the IoT device and onboarding of a digital twin to the cloud platform.

Figure 4:
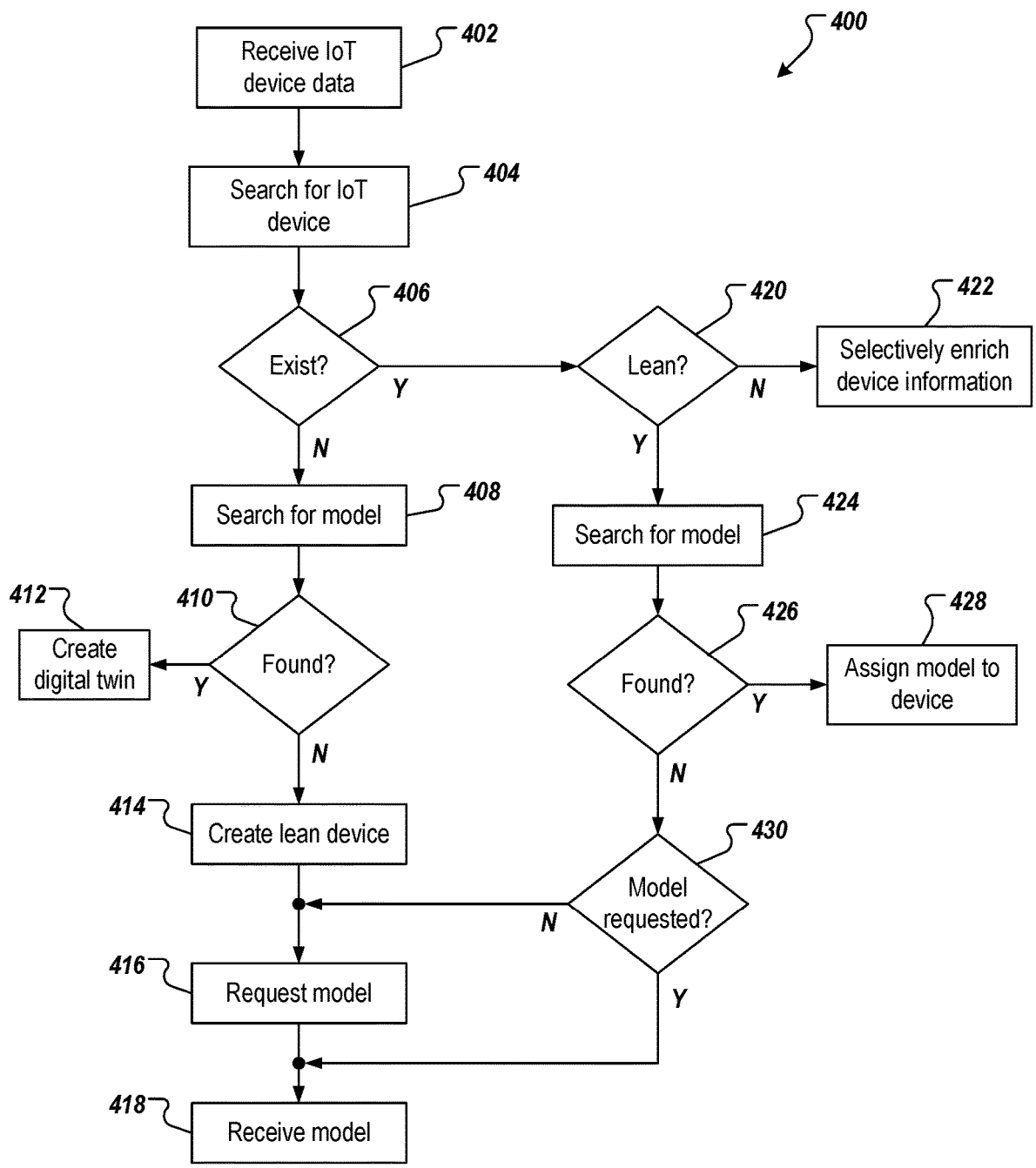
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. The example process 400 is executed to register IoT devices and onboard a digital twin to a cloud platform.

IoT device data of an IoT device is received (402). For example, an edge gateway (e.g., the edge gateway 210 of FIG. 2) receives identification data and/or sensor data of an IoT device (e.g., the IoT device 206). A search for the IoT device is performed (404). For example, the edge gateway provides a call (e.g., through a REST API) to the cloud platform (e.g., the cloud platform 204 of FIG. 2) with one or more parameters (e.g., at least a portion of the identification data) to the cloud platform. In some examples, the cloud platform performs the search based on the one or more parameters to determine whether the IoT device is included in an account that is maintained by the cloud platform. In some examples, the account includes an account of the enterprise operating the IoT network.

It is determined whether the IoT device exists (406). For example, it is determined whether search results indicating existence of the IoT device in the account (e.g., that the IoT device is already registered). If it is determined that the IoT device does not exist (e.g., the IoT device is not already registered), a search for a model is performed (408). For example, the edge gateway sends a search query to the cloud platform through a search API. In some examples, the search query includes one or more parameters (e.g., at least a portion of the identification data). The cloud platform conducts a search and returns a search result. It is determined whether a model is found (410). For example, it is determined whether the search result identifies a model. If a model is found, a digital twin is created (412). For example, the digital twin is created as an instance of the model, which is populated by the identification data and ancillary data received from one or more data sources (e.g., manufacturer, operator, service provider).

If a model is not found, a lean device is created (414) and a model is requested (416). In some examples, the lean device is a data structure that is populated with at least a portion of the identification data and represents a stand-alone device. In some examples, the edge gateway creates the lean device and stores the lean device in memory. In some examples, a request for a model is transmitted to the manufacturer of the IoT device. For example, the request can include the identification data that the manufacturer can use to provide a model for the respective IoT device. A model is received (418). For example, in response to the request, a manufacturer can provide a model for the IoT device that can be used to create the digital twin of the device.

If it is determined that the IoT device does exist (e.g., the IoT device is already registered), it is determined whether the IoT device is a lean device (420). If the IoT device is not a lean device, device information can be enriched (422). For example, if the IoT device is not a lean device, a digital twin of the IoT device is already registered. Consequently, the digital twin can be updated with data provided in the received IoT data. In accordance with implementations of the present disclosure, the IoT data that is received can include sensor data (e.g., data representative of a component (or sub-component) and/or an environment within which the component (or sub-component) is located. The digital twin corresponding to the IoT device can be enriched to include the sensor data. In this manner, the digital twin records the sensor data generated by the respective IoT device.

If the IoT device is a lean device, a search for a model is performed (424). For example, the edge gateway sends a search query to the cloud platform through a search API. In some examples, the search query includes one or more parameters (e.g., at least a portion of the identification data). The cloud platform conducts a search and returns a search result. It is determined whether a model is found (426). For example, it is determined whether the search result identifies a model. If a model is found, the model is assigned to the IoT device to complete creation of a digital twin for the IoT device (428). If a model is not found, it is determined whether a model has already been requested. If a model has not already been requested, a model is requested (416). If a model has been requested, a model is eventually received (418).

Figure 5:
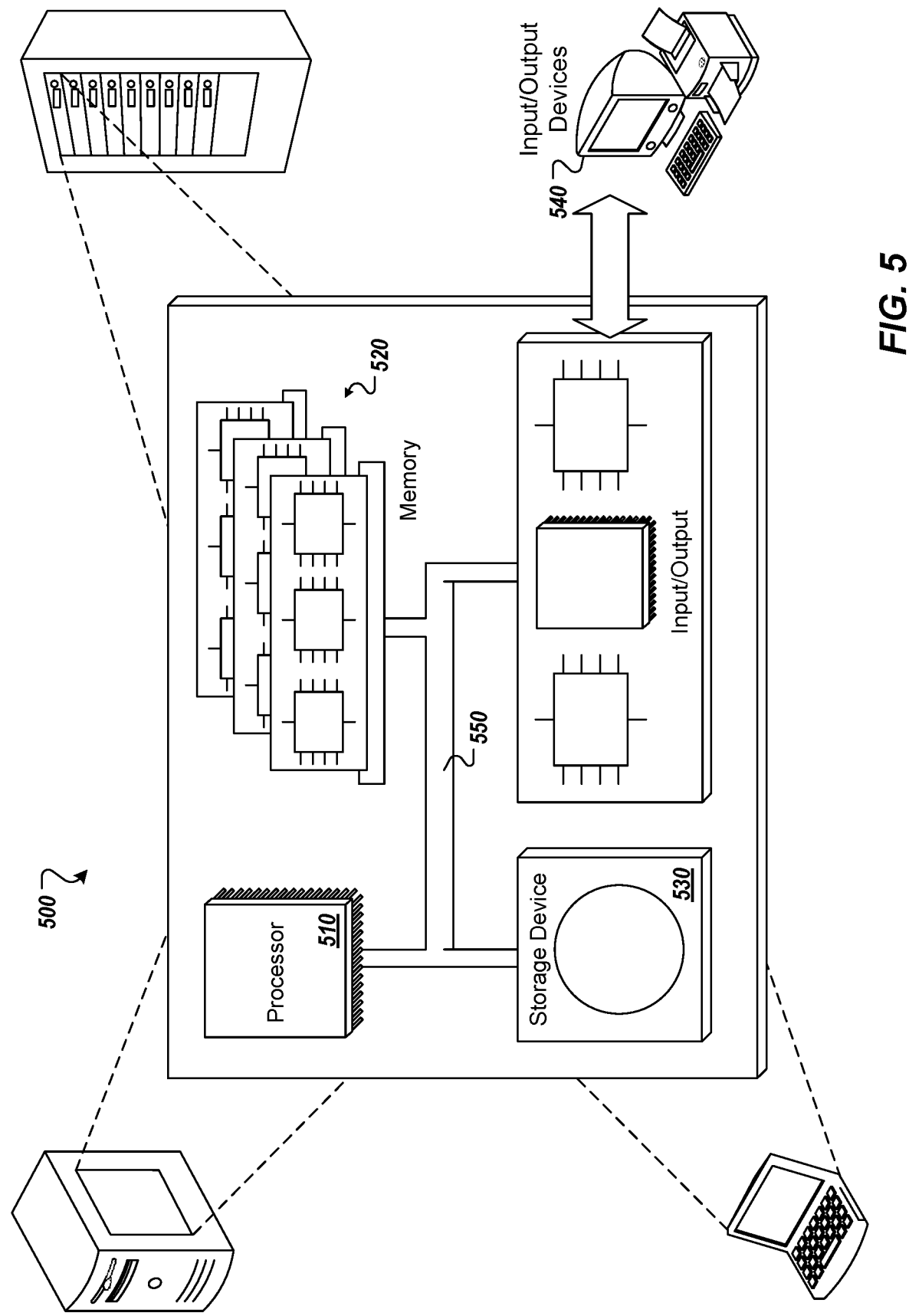
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatically providing digital twins of Internet-of-Things (IoT) devices in IoT networks, the method being executed by one or more processors and comprising:

receiving, by an edge gateway with a digital twin connector of an IoT network, IoT data from an IoT device of the IoT network, the IoT data comprising identification data and sensor data;

initiating, by the edge gateway, registration of the IoT device and onboarding of a digital twin of the IoT device to a cloud platform in response to receiving the IoT data;

determining that the digital twin of the IoT device is stored in the cloud platform based on at least a portion of the identification data, the digital twin of the IoT device comprising a digital representation of the IoT device that is provided as an instance of a model of the IoT device;

searching the model in the cloud platform based on at least a portion of the identification data and information maintained in the cloud platform by provider of the edge gateway in response to the determination that the digital twin of the IoT device is not stored in the cloud platform;

creating the digital twin of the IoT device as an instance of the model by populating the model of the IoT device with at least a portion of the identification data and with ancillary data provided by one or more sources; and enriching the digital twin of the IoT device with the sensor data.

2. The method of claim 1, wherein the one or more data sources comprise one or more of an enterprise that operates the IoT network, and a manufacturer of the IoT device.

3. The method of claim 1, wherein the identification data comprises a serial number of the IoT device, a model number of the IoT device, and a vendor identifier of a manufacturer of the IoT device.

4. The method of claim 1, wherein the model of the IoT device is provided by a manufacturer of the IoT device.

5. The method of claim 1, wherein the IoT data is provided in real-time as sensor data is generated by the IoT device.

6. The method of claim 1, wherein enriching the digital twin of the IoT device with the sensor data comprises associating the sensor data with the digital twin within the cloud platform.

7. A non-transitory computer-readable storage medium coupled to one or more processors and having instructions stored thereon which, when executed by the one or more processors, cause the one or more processors to perform operations for automatically providing digital twins of Internet-of-Things (IoT) devices in IoT networks, the operations comprising:

receiving, by an edge gateway with a digital twin connector of an IoT network, IoT data from an IoT device of the IoT network, the IoT data comprising identification data and sensor data;

initiating, by the edge gateway, registration of the IoT device and onboarding of a digital twin of the IoT device to a cloud platform in response to receiving the IoT data;

determining that the digital twin of the IoT device is stored in the cloud platform based on at least a portion of the identification data, the digital twin of the IoT device comprising a digital representation of the IoT device that is provided as an instance of a model of the IoT device;

searching the model in the cloud platform based on at least a portion of the identification data and information maintained in the cloud platform by provider of the edge gateway in response to the determination that the digital twin of the IoT device is not stored in the cloud platform;

creating the digital twin of the IoT device as an instance of the model by populating the model of the IoT device with at least a portion of the identification data and with ancillary data provided by one or more sources; and enriching the digital twin of the IoT device with the sensor data.

8. The computer-readable storage medium of claim 7, wherein the one or more data sources comprise one or more of an enterprise that operates the IoT network, and a manufacturer of the IoT device.

9. The computer-readable storage medium of claim 7, wherein the identification data comprises a serial number of the IoT device, a model number of the IoT device, and a vendor identifier of a manufacturer of the IoT device.

10. The computer-readable storage medium of claim 7, wherein the model of the IoT device is provided by a manufacturer of the IoT device.

11. The computer-readable storage medium of claim 7, wherein the IoT data is provided in real-time as sensor data is generated by the IoT device.

12. The computer-readable storage medium of claim 7, wherein enriching the digital twin of the IoT device with the sensor data comprises associating the sensor data with the digital twin within the cloud platform.

13. A system, comprising:

a computing device; and a computer-readable storage device coupled to the computing device and having instructions stored thereon which, when executed by the computing device, cause the computing device to perform operations for automatically providing digital twins of Internet-of-Things (IoT) devices in IoT networks, the operations comprising:

receiving, by an edge gateway with a digital twin connector of an IoT network, IoT data from an IoT device of the IoT network, the IoT data comprising identification data and sensor data;

initiating, by the edge gateway, registration of the IoT device and onboarding of a digital twin of the IoT device to a cloud platform in response to receiving the IoT data;

determining that the digital twin of the IoT device is stored in the cloud platform based on at least a portion of the identification data, the digital twin of the IoT device comprising a digital representation of the IoT device that is provided as an instance of a model of the IoT device;

searching the model in the cloud platform based on at least a portion of the identification data and information maintained in the cloud platform by provider of the edge gateway in response to the determination that the digital twin of the IoT device is not stored in the cloud platform;

creating the digital twin of the IoT device as an instance of the model by populating the model of the IoT device with at least a portion of the identification data and with ancillary data provided by one or more sources; and enriching the digital twin of the IoT device with the sensor data.

14. The system of claim 13, wherein the one or more data sources comprise one or more of an enterprise that operates the IoT network, and a manufacturer of the IoT device.

15. The system of claim 13, wherein the identification data comprises a serial number of the IoT device, a model number of the IoT device, and a vendor identifier of a manufacturer of the IoT device.

16. The system of claim 13, wherein the model of the IoT device is provided by a manufacturer of the IoT device.

17. The system of claim 13, wherein the IoT data is provided in real-time as sensor data is generated by the IoT device.

* * * * *